United States Patent [19]

Gross

[11] 3,745,379

[45] July 10, 1973

[54] THYRISTOR CONTROL CIRCUITS INCLUDING MEANS FOR SENSING THE PRESENCE OF AN OBJECT

[75] Inventor: Thomas A. O. Gross, Lincoln, Mass.

[73] Assignee: Arrow-Hart, Inc., Hartford, Conn.

[22] Filed: Sept. 8, 1971

[21] Appl. No.: 178,551

[52] U.S. Cl. ...... 307/252 B, 307/252 UA, 307/309, 307/310, 317/DIG. 2, 328/5

[51] Int. Cl.. H03k 17/68, H03k 17/72, G08b 13/26

[58] Field of Search .................... 307/252 A, 252 B, 307/252 N, 252 Q, 252 T, 252 UA, 252 W, 284, 278, 282, 308, 309, 116; 317/DIG. 2; 324/41; 328/5; 340/258 B, 258 C, 258 D

[56] References Cited

UNITED STATES PATENTS

| | | | |
|---|---|---|---|
| 3,027,467 | 3/1962 | Lipman | 324/41 X |
| 3,050,662 | 8/1962 | Miller et al. | 317/DIG. 2 |
| 3,469,204 | 9/1969 | Magyar et al. | 317/DIG. 2 |
| 3,486,042 | 12/1969 | Watrous | 307/305 X |
| 3,524,078 | 8/1970 | Harris, Jr. | 307/252 B |
| 3,565,402 | 2/1971 | Linke | 340/258 C X |
| 3,601,621 | 8/1971 | Ritchie | 307/116 |
| 3,629,678 | 12/1971 | Tyler | 317/DIG. 2 X |
| 3,644,754 | 2/1972 | Dosch et al. | 307/252 N X |
| 3,648,075 | 3/1972 | Mankovitz | 307/252 B |
| 3,696,257 | 10/1972 | Shano | 307/309 |

FOREIGN PATENTS OR APPLICATIONS

| | | | |
|---|---|---|---|
| 1,294,465 | 5/1969 | Germany | 328/5 |
| 1,187,377 | 4/1970 | Great Britain | 324/41 |

*Primary Examiner*—John W. Huckert
*Assistant Examiner*—L. N. Anagnos
*Attorney*—Davis, Hoxie, Faithfull & Hapgood

[57] ABSTRACT

Thyristor control circuits for the control of alternating circuit power to loads, which circuits operate efficiently and with a minimum of radio frequency interference; and sensor probes which are particularly useful in connection with the thyristor triggering in such circuits.

28 Claims, 8 Drawing Figures

INVENTOR.
THOMAS A.O. GROSS
BY
Davis, Hoxie, Faithfull & Hapgood
ATTORNEYS

INVENTOR.
THOMAS A.O. GROSS
BY
Davis, Hoxie, Faithfull & Hapgood
ATTORNEYS

INVENTOR.
THOMAS A.O. GROSS
BY
Davis, Hoxie, Faithfull & Hapgood
ATTORNEYS

THYRISTOR CONTROL CIRCUITS INCLUDING MEANS FOR SENSING THE PRESENCE OF AN OBJECT

This invention relates to electrical circuits for the control of an electrically powered device in response to the sensing of an event by a transducer. More particularly, the invention relates to electrical circuits utilizing thyristor devices, such as silicon controlled rectifiers and triacs, which operate efficiently and with a minimum generation of radio frequency interference; and to certain probes useful in the circuits for sensing the presence of an object and triggering the thyristor devices in response thereto.

In many of the thyristor circuits which are presently used for control of alternating current power in response to a triggering signal, such as a signal from a sensor, the switching often does not occur precisely at the time of zero-crossing of the AC power; thereby giving rise to voltage transients which produce radio frequency interference. Many such circuits in low power applications also waste a considerable percentage of the power in dropping resistors and the like.

It is therefore an object of my invention to reduce radio frequency interference produced by thyristor power control circuits.

It is another object of my invention to provide improved efficiency in thyristor power control circuits.

It is another object of my invention to provide an inductive sensing system which is highly sensitive to the presence of metallic objects in proximity to a sensitive region of the inductive probe and relatively insensitive to metallic objects in proximity to other parts of the probe.

Other objects and advantages of the invention will become apparent as it is described in connection with the accompanying drawings.

Figure 1:
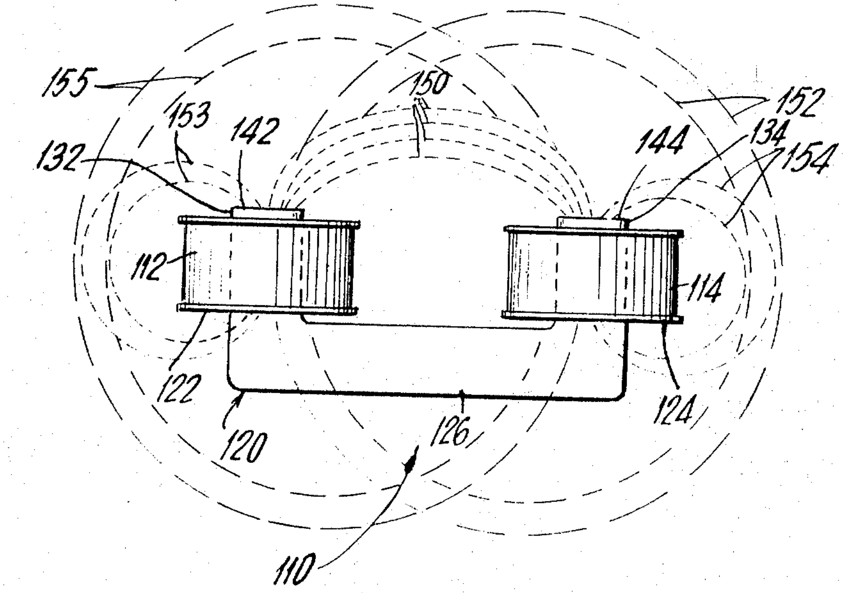
FIG. 1 is a side view of an inductance probe according to the present invention, showing typical approximate lines of magnetic flux.

FIG. 1 shows a preferred inductance probe or pickup transducer 110 of the present invention. Two similar coils 112 and 114 are wound on bobbins 122 and 124 situated around the pole pieces 132 and 134 at the two ends of a C-shaped core 120 of permeable material. The coils 112 and 114 are each wound in the same manner. The coils 112 and 114 are connected together in series aiding connection at the ends nearest the core cross-piece 126. As a result, current flowing through the coils creates a magnetic field in the immediate region of the faces 142 and 144 of pole pieces 132 and 134 and in the area between them, the "near" field, as indicated by the dashed lines 150. Outside this region between the pole faces 142 and 144, however, the magnetic field caused by current flowing through coil 112, indicated by dashed lines 152 and 153, tends to cancel the magnetic field caused by the current flowing through coil 114, indicated by dashed lines 154 and 155. The transducer 110 is therefore highly responsive to a metallic object in the region of the pole piece faces 142 and 144, and in the gap between them, but quite insensitive to such objects remote from the pole piece faces.

The presence of many kinds of objects, particularly a metallic object, within the "near" region of the pole piece faces 142 and 144 causes a change in the inductance of the transducer 110 from that when no such object is in the region. Permeable objects cause an increase in inductance while non-permeable, highly conductive objects cause a decrease in inductance.

An inductance pickup of the type described with respect to FIG. 1, suitable for use with 60 Hz. alternating current in the embodiment of FIG. 4 can be made as follows. Two Cosmo type 1206 bobbins are each reduced in length from fifteen thirty-seconds inch to three-eights inch by cutting and rejoining, for example, by use of the heat from a soldering iron. The coils each comprise 3,000 turns of 39 gauge wire wound on one of the modified bobbins. The bobbins in turn are placed on the pole pieces of a Ferroxcube type U 376U25-0–3E2A core to complete the inductance pickup. The resistance of this pickup should be 780 ohms ± 15 percent; the inductance should be 0.83 Henry ± 15 percent and the "Q" should be not less than 0.55 at 1 volt, 100 Hz.

Figure 2A:
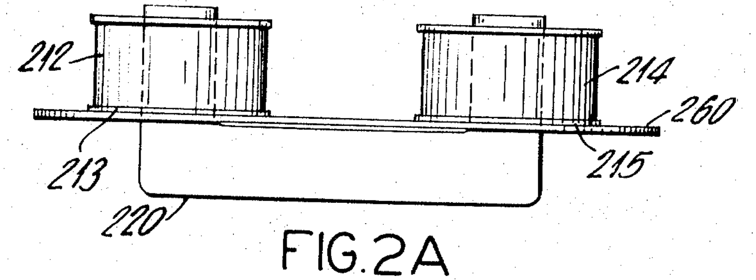
FIGS. 2A and 2B are side and top views, respectively, of an alternative inductance probe having a flux shield incorporated therein.
Figure 2B:
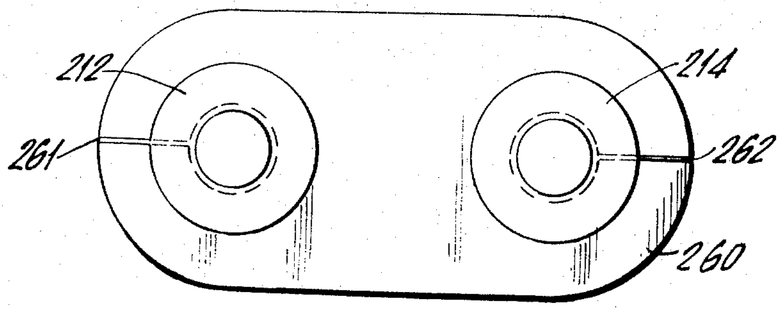

In the case of inductive pickups for high frequency systems (e.g.: 15 to 20 kHz.), the percentage change in inductance caused by the presence of a given object can be improved by placing a sheet 260 of 0.030 inch copper or aluminum adjacent the inner ends 213 and 215 of coils 212 and 214, as indicated in FIGS. 2A and 2B. This will reduce the self-inductance due to flux encircling each of the coils 212 and 214.

Figure 3:
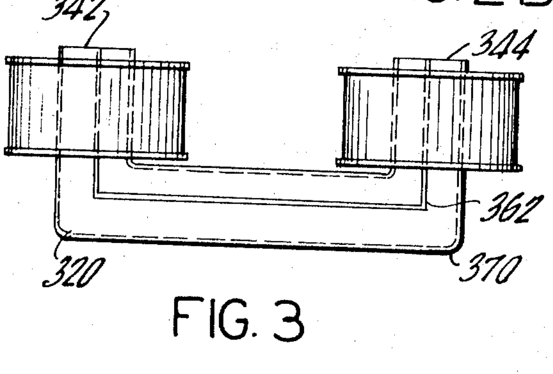
FIG. 3 is a side view of a further alternative probe particularly suited to high sensitivity, high frequency operation.

A further alternative design for very sensitive inductive pickups is shown in FIG. 3. In this case, copper is sputtered or electrodeposited over the entire ferrite core except for the pole faces 342 and 344 and along one line 362 moving the length of the core 320 where the copper has been cut through, e.g., by scoring, to avoid having a shorted turn. Slits 261 and 262 (FIG. 2B) are provided to avoid having a shorted turn about the core 220.

Figure 4:
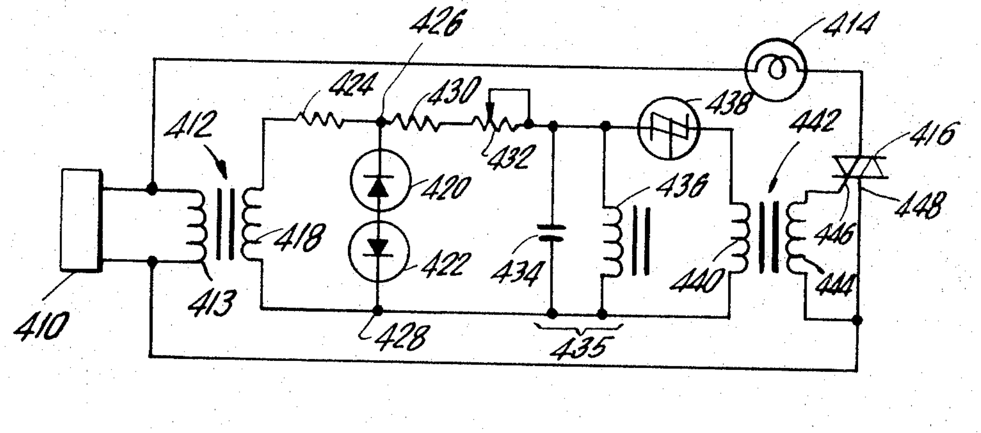
FIG. 4 is a schematic diagram of a first circuit for use with a probe of FIGS. 1 or 2A and 2B.

FIG. 4 shows a trigger circuit suitable for use with the probes of FIGS. 1 and 2. An alternating circuit voltage input signal from an alternating frequency power source 410 is coupled to the primary winding 413 of a balanced isolation transformer 412. The primary winding 413 is in turn arranged in parallel with a series circuit comprising an incandescent lamp 414 and a triac 416.

The secondary winding 418 of the transformer 412 is shunted by back-to-back zener diodes 420 and 422 through series resistance 424. The zener diodes, which draw current through the series resisto 424, maintain a constant voltage across terminals 426 and 428. Resistor 430 and variable resistor 432 are connected in series from terminal 426 to one terminal of capacitor 434.

The inductor probe 436 is arranged in parallel with capacitor 434 to form a low Q parallel resonant circuit 435. The inductor probe 436 functions as a variable inductance to tune the circuit. The impedance of this circuit 435 increases as the resonant frequency of the circuit 435 approaches the frequency of the power source 410, causing an increased potential across a bilateral switch semiconductor device 438 which is coupled in series with the primary winding 440 of the trigger pulse transformer 442. The secondary winding 444 of the transformer 442 is connected between the gate 446 and one anode-cathode terminal 448 of the triac 416. The transformer 442 provides isolation between the triac 416 and bilateral switch 438.

When a sufficient voltage is applied upon bilateral switch 438 to trigger it, the current flowing through the primary winding 440 of tthe trigger transformer 442 induces a flow through the secondary winding 444 which triggers the triac 416 on permitting current to flow through and operate lamp 414 until the current flow between the two anode-cathode terminals of the triac 416 is insufficient to sustain conduction, at which time the triac 416 switches off again. Since the triac is, by its nature, a bidirectional device, it can be triggered on for current flow in eitherdirection.

The triggering of bilateral switch 438 is determined by the resonant frequency of circuit 435, and by ajdustment of variable resistor 432. As a conductive or magnetic object comes within the "near" field of probe 436, its inductance is increased and the impedance of the circuit 435 is increased. That impedance and resistors 430 and 432 form a voltage divider, dividing the voltage from terminals 426 and 428. Each time the voltage across bilateral switch 438 reaches its triggering voltage, as a result of the increase in potential on the first half of each half cycle of current and the division of potential across tthe parallel resonant circuit 435 and the resistors 430 and 432, the bilateral switch is triggered.

A relay, solenoid or other device could be controlled by this circuit in a manner similar to the lamp 414 shown.

Typical values for the circuit shown in FIG. 4, for operation on 110 volts, 60 cycle A.C. would be:

| | |
|---|---|
| Zener diodes 420 and 422 | 91 volts |
| Resistor 424 | 2,700 ohms |
| Resistor 430 | 8,200 ohms |
| Variable Resistor 432 | 10,000 ohms max. |
| Capacitor 434 | 1.0 μf. |
| Inductance Probe 436 | 0.83 Henrys |

For the bilateral switch 438 General Electric type No. 2N 4991 and for the triac 416 General Electric type No. SC40D are suitable for use in the described circuit.

Figure 5:
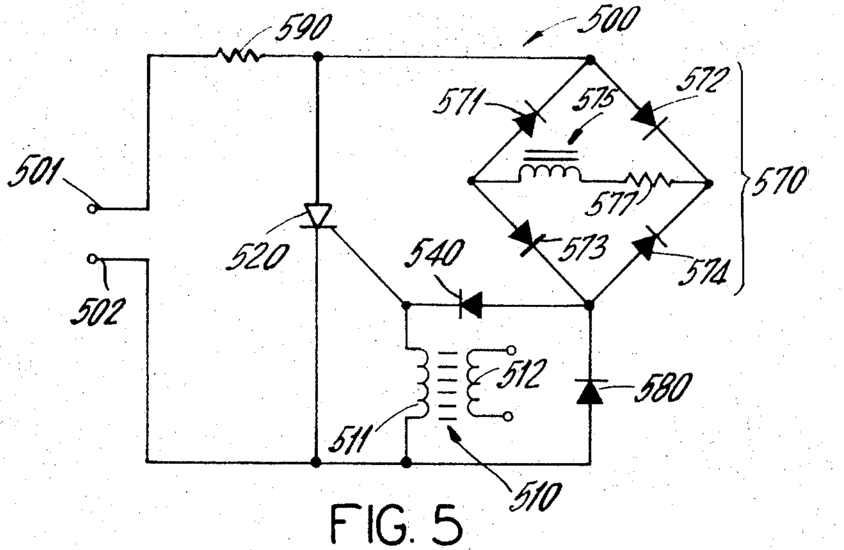
FIG. 5 is a schematic diagram of an SCR trigger circuit according to the present invention, having low radio-frequency interference characteristics.

FIG. 5 is a schematic diagram of a simple trigger circuit 500 according to the present invention. A source of alternating current is connected to leads 501 and 502. The load to be supplied with power under control of the circuit is portrayed as resistor 590. When SCR 520 conducts, the alternating current will flow through the load. The secondary winding 511 of the saturable transformer 510 is connected in shunt with the gate of SCR 520. The primary or control winding 512 of the transformer 510 is connected to a source of control voltage (not shown).

When the transformer 510 is not saturated, the impedance of winding 511 is very high so the current from the bridge of rectifiers 571, 572, 573 and 574 will flow through diode 540 and then through the gate of SCR 520 during the first part of a positive half cycle of the alternating current applied to leads 501 and 502, causing SCR 520 to turn on.

When transformer 510 is saturated, the bridge current during the positive half cycle will flow through diode 540, but will be shunted past the gate of SCR 520 by the low impedance of winding 511, preventing the occurrence of a sufficiently high gate current to trigger the SCR 520.

The saturation of the transformer 510 is controlled by an externally supplied control current $I_c$, which is applied to flow through the primary winding 512 of the transformer 510. The impedance of the secondary winding 511 is a function of the current $I_c$ in the primary winding 512. When the transformer 510 is saturated, it can be reset and the SCR 520 made to trigger by applying a current $I_c$ in the appropriate direction through tthe primary winding 512 of the transformer 510. A choke, represented by a series inductance 575 and resistance 577, acts as a low pass filter in the gate circuit to prevent fast transients from the alternating current source from causing undesired triggering of SCR 520. The diode 580 is provided to supply current to the bridge during the half cycle when the potential on the SCR 520 anode is negative.

If the value of the inductance 575 were infinite, the waveforms of the currents flowing through the bridge 570 and therefore through diodes 540 and 580 would have a rectangular waveform. Ample energy would be available to trigger the SCR 520 at the instant of zero crossing provided that the bridge 570 could supply the minimum gate current of the SCR 520. At all other times the SCR 520 would not be gated either because of the negative potential on its anode in one-half cycle or the saturation of the transformer 510 during the other half cycle.

In fact it is not necessary for the inductance 575 to be infinite to achieve nearly perfect coincidence of triggering with the zero crossing. It is merely necessary that the value of the inductance 575 be sufficiently large as to maintain a continuous flow of current from the bridge output throughout each half cycle. This minimum allowable inductance is called the critical inductance. The method of calculation of the critical inductance is described at page 601 of Terman, *Radio Engineers' Handbook*(1st Ed., 1943).

event that circuit 500 of FIG. 5 has the advantage that the rectifier bridge 570 can be used to supply direct current to associated circuits or devices. In the eventthat the direct current is to be used in this manner, however, an inductance-input rather than a capacitor input filter should be employed. The latter would produce late firing of the SCR 520.

Figure 6:
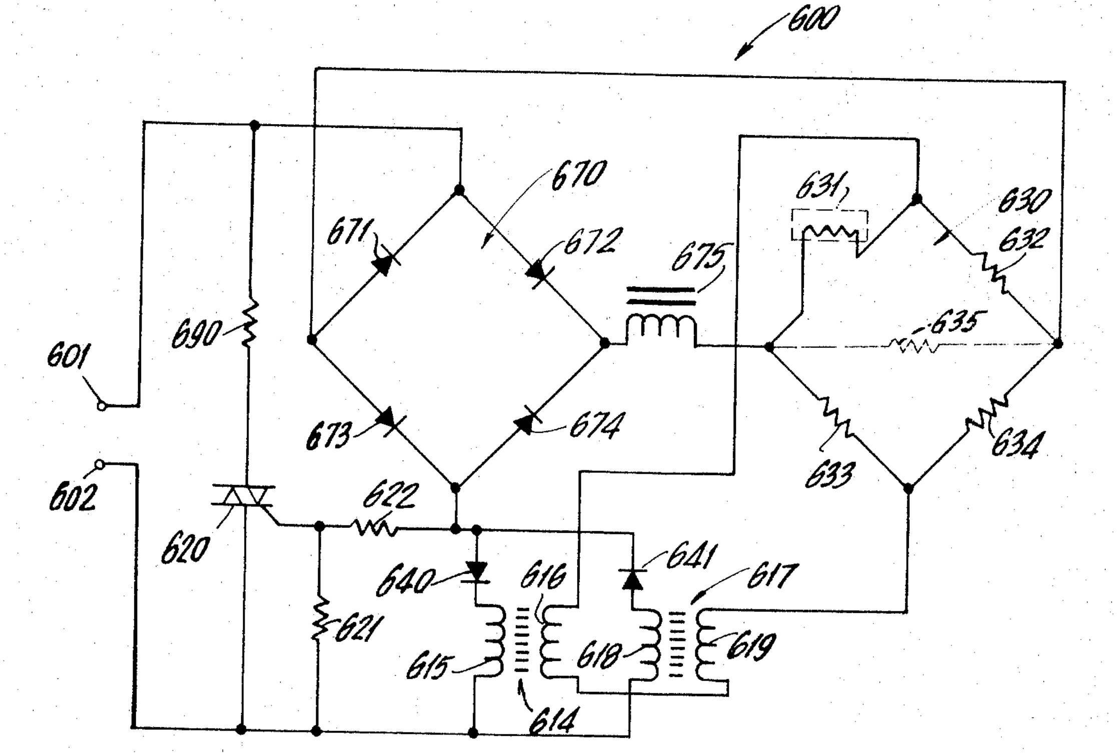
FIG. 6 is a schematic of a triac trigger circuit according to the present invention, having low radiofrequency interference characteristics.

FIG. 6 is a schematic diagram of a circuit 600 according to the present invention utilizing a sensor 631 connected in a direct current bridge 630. A source of alternating current is connected to leads 601 and 602. The load to be supplied with power under control of the circuit is portrayed as resistor 690. When the triac 620 conducts, the alternating current will flow through the load. The saturable transformers 614 and 617 have secondary windings 615 and 618, respectively, connected in shunt with the gate of the triac 620 through diodes 640 and 641, respectively. The primary or control windings 616 and 619 of the transformers 614 and 617 are connected in series to a source of control voltage, discussed below. Resistors 621 and 622 are selected to form a divider which matches the gating voltage requirements of the triac to the other circuit elements.

When a positive half cycle of the alternating current is applied to lead 601 and the negative to 602, the transformer 614 is not saturated; the impedance of winding 615 is very high. Diode 641 blocks the flow of any current through winding 618 of transformer 617 at this time. As a result, the current from the bridge 670 of rectifier diodes 671, 672, 673 and 674 flows through diode 640 and a sufficient portion will flow through the gate of the triac 620 to turn the triac on. Similarly, when the polarity of the voltages applied to leads 601 and 602 are reversed and if transformer 617 is not saturated, current flows through winding 618 and diode 641 to trigger the triac 620.

When the transformers 614 and 617 are saturated during the half cycle when their associated diodes 640 and 641 will conduct current from the rectifier bridge 670, the current from the bridge will be shunted past the gate electrode of the triac 620 by the low impedance of the transformer windings 615 and 618. The triac 620 then will not be triggered.

The rectifier bridge 670 supplies direct current to operate the sensor bridge 630. The choke 675 also provides the inductance required for proper coincidence of triggering with zero crossing, as described above with respect to inductance 675 in FIG. 2, and smooths the output of the rectifier bridge 670.

The sensor bridge 630 is comprised of the sensor 631, the resistance of which is dependent upon the function to be sensed (e.g., temperature), and the resistors 632, 633 and 634, the values of which may be selected in accordance with the well known principles of such bridges. The output of the bridge is connected directly to series-connected primary windings 616 and 619 of transformers 614 and 617 respectively. When the sensor bridge 630 is balanced, no current flows through these windings 616 and 619, the transformers 614 and 617 will not be saturated; and the triac 620 will be triggered at the beginning of the next half cycle of the alternating current applied to leads 601 and 602.

Figure 7:
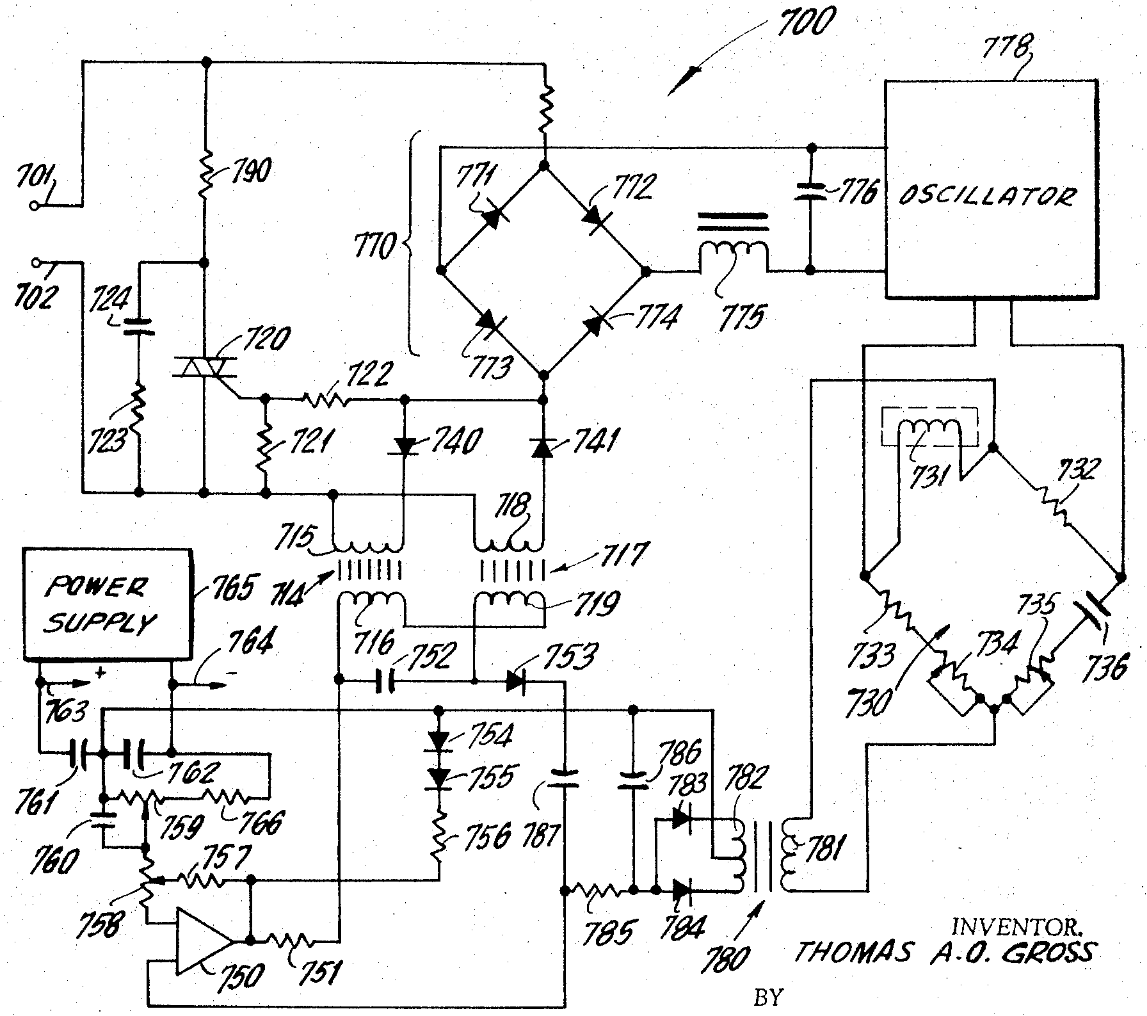
FIG. 7 is a schematic diagram of a high frequency inductance probe circuit according to the present invention, having low radio frequency interference characteristics.

FIG. 7 is a schematic and block diagram of a circuit 700 according to the present invention. A source of alternating current is connected to leads 701 and 702. The load to be supplied with power under control of the circuit is portrayed as resistor 790. When the triac 720 conducts, the alternating current will flow through the load. The saturable transformers 714 and 717 have secondary windings 715 and 718, respectively, connected in shunt with the gate of the triac 720 through diodes 740 and 741, respectively. The primary or control windings 716 and 719 of the transformers 714 and 717 are connected in series to a source of control voltage, discussed below. Resistors 721 and 722 are selected to form a divider which matches the gating voltage requirements of the triac to the output signal provided by saturable transformers 714 and 717. When a positive half cycle of the alternating current is applied to lead 701 and and the negative to 702, the transformer 714 is not saturated and the impedance of winding 715 is very high. Diode 741 blocks the flow of any current through winding 718 of transformer 717 at this time. As a result the current from bridge 770 of rectifier diodes 771, 772, 773 and 774 flows through diode 740 and a sufficient portion will flow through the gate of the triac 720 to turn the triac on. Similarly, when the polarity of the voltages applied to leads 701 and 702 is reversed and if transformer 717 is not saturated, current flows through winding 718 and diode 741 to trigger the triac 720.

When the transformers 714 and 717 are saturated during the half cycle when their associated diodes 740 and 741 will conduct current from the rectified bridge 770, the current from the bridge will be shunted past the gate electrode of the triac 720 by the low impedance of the secondary windings 715 and 718, and the triac 720 will not be triggered.

A known phenomenon of thyristor action is that the thyristor will turn on when the rate of voltage change across the anode to cathode junction exceeds a certain value. Under such conditions, the thyristor will turn on in the absence of a triggering voltage and despite the fact that the maximum voltage applied across the anode to cathode junction is less than the peak voltage rating of the thyristor.

The circuit 700 of FIG. 7 includes a resistor 723 in series with a capacitor 724 connected between the terminals of the triac 720. The combination of resistor 723 and capacitor 724 prevents the voltage across the main junction of the triac 720 from changing rapidly enough to turn on the triac. A typical value for the capacitor 724 for the circuit of FIG. 7 is 0.1 microfarads. The capacitor 724 should preferably be designed for operation at high frequencies. A suitable value for resistor 723 is 100 ohms. The suppression of an excessive rate of voltage rise across the thyristor junction is discussed in the *G.E. SCR Manual* (4th Edition) at pages 46 through 49.

The rectifier bridge 770, comprising diodes 771, 772, 773 and 774, supplies direct current to power the oscillator circuit 778. The choke 775 and capacitor 776 function as a choke input LC filter for the power supply. The choke 775 also provides the inductance required for proper coincidence of triggering with zero crossing, as described above with respect to inductance 575 in FIG. 5.

The oscillator 778 supplies alternating current for the operation of the probe bridge 730, which is a Hays-type bridge having an inductance probe 731 (such as the probe of FIGS. 1 3) in one leg, resistances 732 and resistances 733 and 732 in the adjacent legs, and series-connected resistance 735 and capacitor 736 in the opposite leg. Resistances 734 and 735 are preferably variable resistors, so that the balance point of the bridge 730 can be adjusted. The output of the oscillator 778 is connected in conventional fashion to two opposite corners of the bridge 730. The output of the bridge 730 is taken from the two intermediate corners of the bridge and connected to the input winding 781 of the signal transformer 780.

When a conductive or permeable object comes within the magnetic field of the probe 731, the self inductance of the probe 731 is changed by the presence of the object. The probe bridge 730, having been balanced in the absence of such objects, is unbalanced by the change in inductance of probe 731. As a result, alternating current from oscillator 778 is applied to the primary winding 781 of the signal transformer 780 in an amount proportional to the degree of imbalance of the bridge 730. The signal which is then produced on the output winding 782 of signal transformer 780 is then rectified by diodes 783 and 784 and filtered by the RC filter comprising resistor 785 and capacitors 786 and 787. The resulting D.C. signal, which is proportional to the degree of imbalance of the probe bridge 730 is applied to one input of differential amplifier 750 and compared with a reference signal applied to the other input terminal of amplifier 750, which is derived from the voltage output of ± 12-volt D.C. power supply 765 and feedback from the amplifier output via resistance 757 and variable resistance 758. The output of the differential amplifier 750 is connected via resistor 751 to the series-connected windings 716 and 719 of the saturable transformers 714 and 717, respectively. When tthe output of differential amplifier is sufficiently large the transformers 714 and 717, which had previously been maintained in the saturated mode, are no longer saturated, causing the triac 720 to be triggered at the onset of the next half cycle of the alternating current applied to leads 701 and 702.

Although only a few of the possible embodiments of my invention are disclosed here, others will be obvious to those skilled in the art. In particular, the invention which is disclosed herein in terms of single-phase circuits, can also be applied to multiple-phase circuits.

I claim:

1. An electronic circuit for control of the supply of power to a load comprising:

a thyristor, having a gate electrode and two power electrodes, the thyristor being connected to control the flow of current to the load;

a triggering transformer having a primary winding and a secondary winding;

a first subcircuit comprising the secondary winding of the transformer and being connected between one power electrode and the gate of the thyristor;

a rectifier bridge having input and output terminals;

a second subcircuit connected in parallel with at least the thyristor and comprising in series the input terminals of the rectifier bridge, a diode and the secondary winding of the transformer;

an inductive third subcircuit connected between the output terminals of the rectifier bridge comprising a first inductor; and means for applying a signal to the primary winding of the transformer.

2. The circuit of claim 1 wherein the power controlled is alternating current power.

3. The circuit of claim 2 wherein the triggering transformer is a saturable transformer, the secondary winding of the transformer acting to deactivate the thyristor gate when the transformer is saturated.

4. The circuit of claim 3 wherein the inductance of the first inductor is not less than the critical inductance.

5. The circuit of claim 4 wherein the means for applying a signal to the primary winding of the transformer comprises a probe bridge circuit having an input and output, variable impedance probe is one of the elements of the probe bridge, the output of the probe bridge is operatively connected to the primary winding of the transformer, and the input of the probe bridge circuit is operatively connected to the output of the rectifier bridge.

6. The circuit of claim 5 wherein the third subcircuit comprises the first inductor and the input of the probe bridge circuit.

7. The circuit of claim 5 further comprising a second triggering transformer wherein the primaries of the two triggering transformers are connected in series and connected to the output of the probe bridge.

8. The circuit of claim 6 further comprising a second triggering transformer wherein the primaries of the two triggering transformers are connected in series across the output of the probe bridge.

9. The circuit of claim 5 wherein the probe is a second inductor.

10. The circuit of claim 7 wherein the probe is a second inductor.

11. The circuit of claim 9 further comprising an oscillator, the signal output of which is connected to the input of the probe bridge, and a signal detector subcircuit connected to the output of the probe bridge.

12. The circuit of claim 10 further comprising an oscillator, the signal output of which is connected to the input of the probe bridge, and a signal detector subcircuit connected to the output of the probe bridge.

13. The circuit of claim 11 wherein the power for operating the oscillator is supplied from the rectifier bridge.

14. The circuit of claim 12 wherein the power for operating the oscillator is supplied from the rectifier bridge.

15. The circuit of claim 11 wherein the signal detector sub-circuit comprises a rectifier, a comparator having as its inputs the output of the rectifier and a reference signal, the output of the amplifier being connected to the primary winding of the triggering transformer.

16. The circuit of claim 12 wherein the signal detector sub-circuit comprises a rectifier, a comparator having as its inputs the output of the rectifier and a reference signal, the output of the amplifier being connected to the series connected primary windings of the triggering transformers.

17. The circuit of claim 15 wherein the probe bridge output is coupled to the rectifier by a further transformer.

18. The circuit of claim 16 wherein the probe bridge output is coupled to the rectifier by a further transformer.

19. An electronic circuit for control of the supply of powwer to a load comprising:

a thyristor, having a gate electrode and two power electrodes, the thyristor being connected to control the flow of current to the load;

a rectifier bridge having input and output terminals;

a first subcircuit connected in parallel with at least the thyristor and comprising in series the input terminals of the rectifier bridge and a diode;

an inductive second subcircuit connected between the output terminals of the rectifier bridge comprising a first inductor; and a third subcircuit arranged to trigger the thyristor, comprising a probe bridge including an inductance probe having a permeable core with two or more pole pieces and a gap between the pole pieces, a coil wound about each of the pole pieces, the coils being connected so that the magnetic fields created in the gap by each will aid that created in the gap by the others.

20. The circuit according to claim 19 in which the coils of the probe are connected in series.

21. The circuit according to claim 19 further comprising at least one triggering transformer having a primary winding and a secondary winding, and a fourth sub-circuit comprising the secondary winding of the triggering transformer and being connected between one power electrode and the gate of the thyristor.

22. The circuit of claim 21 wherein the second sub-circuit comprises the first inductor in series with the probe bridge input, and the output of the probe bridge is operatively coupled to the primary winding of the triggering transformer.

23. The circuit of claim 22 wherein the first subcircuit further comprises the secondary winding of the triggering transformer in series with the diode and the rectifier bridge input terminals.

24. The circuit of claim 23 wherein the third subcircuit further comprises an oscillator, the signal output of which is connected to the input terminals of the probe bridge, and a signal detector subcircuit having an input connected to the output of the probe bridge and an output connected to the primary winding of the triggering transformer.

25. A circuit for the control of the supply of power to a load comprising a thyristor device, having a gate electrode, the device being connected to control the flow of current to a load;

an inductance probe having a permeable core with two or more pole pieces and a gap between the pole pices, a coil wound about each of the pole pieces, the coils being connected so that the magnetic fields created in the gap by each will aid that created in the gap by the others, the probe being arranged so that the presence of conductive or permeable objects in the vicinity of its probe pieces will affect its impedance and inductance;

a source of alternating current having a characteristic frequency; and a low Q parallel resonant circuit connected to the current source, comprising a condensor and the inductance probe, said resonant circuit having a resonant frequency in the absence of objects from the vicinity of the pole pieces of the probe differing from the characteristic frequency of the current source, wherein the resonant circuit is arranged to cause triggering of the gate electrode of the thyristor device upon the occurrence of a predetermined change in impedance of the inductance probe.

26. A circuit in accordance with claim 25 further comprising a triggering transformer and a bilateral switch semiconductor device, in which the gate electrode of the thyristor is in series with a secondary coil of the triggering transformer, the bilateral switch is in series with a primary coil of the triggering transformer, and the series combination of the bilateral switch and primary coil are in parallel with the parallel resonant circuit.

27. The circuit according to claim 19 wherein the probe further comprises a conductive, non-ferromagnetic plate separating and shielding the crosspiece of tthe core on its one side from the coils on its other side, said plate having apertures through each of which a pole piece passes and a slit from the outer periphery of the plate to each such aperture.

28. The circuit according to claim 19 wherein the probe further comprises a thin layer of a conductive, non-ferromagnetic, metallic material on the entire surface of the probe core except the pole faces and along narrow lines running between pole faces.

* * * * *

PO-1050
(5/69)

UNITED STATES PATENT OFFICE
CERTIFICATE OF CORRECTION

Patent No. 3,745,379 Dated July 10, 1973

Inventor(s) Thomas A. O. Gross

It is certified that error appears in the above-identified patent and that said Letters Patent are hereby corrected as shown below:

Col. 3, line 27, "eitherdirection" should read --either direction--.

Col. 4, line 51, "event that" should read --The--;

line 54, "eventthat" should read --event that--.

Col. 6, line 47, "1 3" should read --1-3--.

Col. 7, line 15, "tthe" should read --the--.

Signed and sealed this 20th day of November 1973.

(SEAL)
Attest:

EDWARD M.FLETCHER,Jr.
Attesting Officer

RENE D. TEGTMEYER
Acting Commissioner of Patents